Patented June 14, 1932

1,862,825

UNITED STATES PATENT OFFICE

NAPOLEON ARTHUR LAURY, OF ROCKVILLE CENTER, NEW YORK, ASSIGNOR, BY MESNE ASSIGNMENTS, TO THE CALCO CHEMICAL COMPANY, INC., A CORPORATION OF DELAWARE

METHOD OF MAKING SULPHUR TRIOXIDE AND CATALYST FOR USE IN SAID METHOD

No Drawing. Application filed August 15, 1928. Serial No. 299,879.

This invention relates to a method of making sulphur trioxide and to a catalyst for use in said method.

In making sulphuric acid by the contact method, it is customary to bring sulphur dioxide gas and oxygen into contact with a catalyst at a temperature of about 500° C. The most common catalyst for this purpose is platinum. Vanadium catalysts have been proposed, but have not, so far as I am aware, proved sufficiently successful to be adopted in commercial use generally.

I have ascertained that the efficiency of a vanadium catalyst in oxidizing $SO_2$ to $SO_3$ is in a large degree dependent upon the nature of the carrier used for the catalyst. Various carriers have been proposed including diatomaceous earth in powdered form. I have ascertained that a powdered carrier for the catalyzer involves a waste of the catalytic material by coating surfaces of the carrier with which gases cannot come in contact. Attempts have been made to aggregate diatomaceous material after catalytic material has been applied to it, but the particles thus produced are easily friable, and, for that reason, difficult to handle and not infrequently injured in use.

I have discovered that a desirable catalytic mass can be made by applying the catalyst to a carrier consisting of a natural aggregate of diatomaceous earth which has been fired to a temperature of 1000° C. in order to make its particles strong and non-friable. The particles of such a mass are massive, that is, the mass is not in powdered form, and have great physical strength which facilitates handling the mass and prevents it from cracking and becoming pulverized in use. The great physical strength given to the particles by heating to a temperature of about 1000° C. is believed to be the result of the fusion of a minute proportion of non-silicious material occurring as an impurity in diatomaceous earth and fusible at a temperature below that at which the silicious material itself would be fused or sintered. This fused material appears to act as a strong binder, although it is present in such a minute quantity and is fusible at such a temperature that neither its fusion nor heating sufficiently to fuse it damages the lace-like surface of the particles which remains substantially as in natural diatomaceous particles. Because of the great physical strength thus given to the particles, the mass remains easily permeable by the gases, while at the same time the lace-like surface of the particles, when covered with a thin coating of catalytic material, has been found to enhance the catalytic effect of the material upon the gases.

As a specific example of a catalyzer embodying my invention, I cite the following:

A natural diatomaceous earth aggregate consisting of particles which will not pass through a U. S. standard six mesh sieve such as "celite" brick chips, is fired to a temperature of 1000° C. to give the individual particles great physical strength and render them non-friable. The mass is then spread out thin and sprayed with a solution of sodium vanadate ($Na_3 VO_4$) or other soluble vanadium salt. For each pound of the aggregate, 0.4 pound of sodium vanadate is used. After the mass has been thoroughly sprayed, it is dried, and is heated to a temperature of approximately 500° C. for one hour, preferably in an atmosphere of $SO_2$. The resulting mass is easily handled, and is an efficient catalytic mass for use in the contact method of making sulphuric acid.

In making sulphur trioxide by means of the catalytic mass above described, a mixture containing sulphur dioxide and oxygen is passed through the mass at an elevated temperature. As the vanadium is not injuriously affected by arsenic and other impurities which "poison" a platinum catalyzer, the usual step of purifying the sulphur dioxide may be omitted.

What I claim is:

1. A catalytic mass for use in the contact method of making sulphuric acid, comprising massive particles of diatomaceous earth which are of a size sufficient to make a mass of them easily gas-permeable and which have been heated to a temperature of approximately 1000° C. to render them non-friable, and a compound containing vanadium coated on said particles.

2. The method of making a catalytic mass, which comprises heating massive particles of diatomaceous earth too large to pass through a U. S. standard six-mesh sieve to a temperature of 1000° C. to render them non-friable, spraying a solution of a vanadium salt on the surfaces of said particles, and then heating the particles to a temperature of approximately 500° in an atmosphere of sulphur dioxide.

3. The method of making a catalytic mass, which comprises firing massive particles of diatomaceous earth too large to pass through a U. S. standard six-mesh sieve to render them non-friable, applying a solution of a vanadium compound to said particles, and then heating the particles in an atmosphere containing sulphur dioxide.

4. A catalytic mass for use in the contact method of making sulphuric acid, comprising natural diatomaceous particles which are of sufficient size to render the mass easily gas permeable and which have been fired to a temperature which renders them non-crumbling without changing their lace-like surface, and a catalytic material coated upon the surfaces of said particles.

5. The method of making a catalytic mass, which consists in firing natural diatomaceous particles of a size sufficient to make a mass of them easily gas permeable, and applying a coating of a compound of vanadium to the fired particles.

6. The method of making sulphur trioxide, which consists in passing a mixture of oxygen and sulphur dioxide at an elevated temperature through a gas-permeable mass of massive diatomaceous particles which have been rendered non-crumbling by firing and have lace-like surfaces coated with a catalytic material.

In testimony whereof I have hereunto set my hand.

NAPOLEON ARTHUR LAURY.